United States Patent [19]

Frye

[11] 3,998,143
[45] Dec. 21, 1976

[54] BATTERY POWERED COFFEE MAKER

[76] Inventor: Helen G. Frye, 741 S. Sherwood Road, Smyrna, Ga. 30080

[22] Filed: Dec. 12, 1975

[21] Appl. No.: 640,051

Related U.S. Application Data

[63] Continuation-in-part of Ser. No. 549,350, Feb. 12, 1975, abandoned.

[52] U.S. Cl. .................................................. 99/280
[51] Int. Cl.² ........................................ A47J 31/00
[58] Field of Search ................... 99/279, 280–281, 99/282–283, 416, 446; 126/273.5; 219/387, 441

[56] References Cited

UNITED STATES PATENTS

| | | | |
|---|---|---|---|
| 1,234,059 | 7/1917 | McQueston | 126/273.5 |
| 1,662,556 | 3/1928 | Woodson | 219/441 |
| 3,290,484 | 12/1966 | Day | 219/441 |
| 3,482,078 | 12/1969 | Milne | 219/387 |
| 3,491,227 | 1/1970 | Stephens | 219/441 X |
| 3,818,180 | 6/1974 | Arosio | 219/441 X |
| 3,915,079 | 10/1975 | Balderson | 99/281 |
| 3,931,494 | 1/1976 | Fisher et al. | 219/441 |

Primary Examiner—Stanley N. Gilreath
Assistant Examiner—Arthur O. Henderson
Attorney, Agent, or Firm—James B. Middleton

[57] ABSTRACT

A battery powered coffee maker, for non-boil coffee and the like, including a generally rectangular container having a battery contained in the base of the container, electrical heating elements in the walls and in the base of the container for providing gentle heat, and an insulated housing for the container to reduce heat loss. The apparatus includes electrical circuitry to allow all heating elements to be used for brewing coffee and the like and to allow only the base heating element to be used to maintain serving temperature.

3 Claims, 4 Drawing Figures

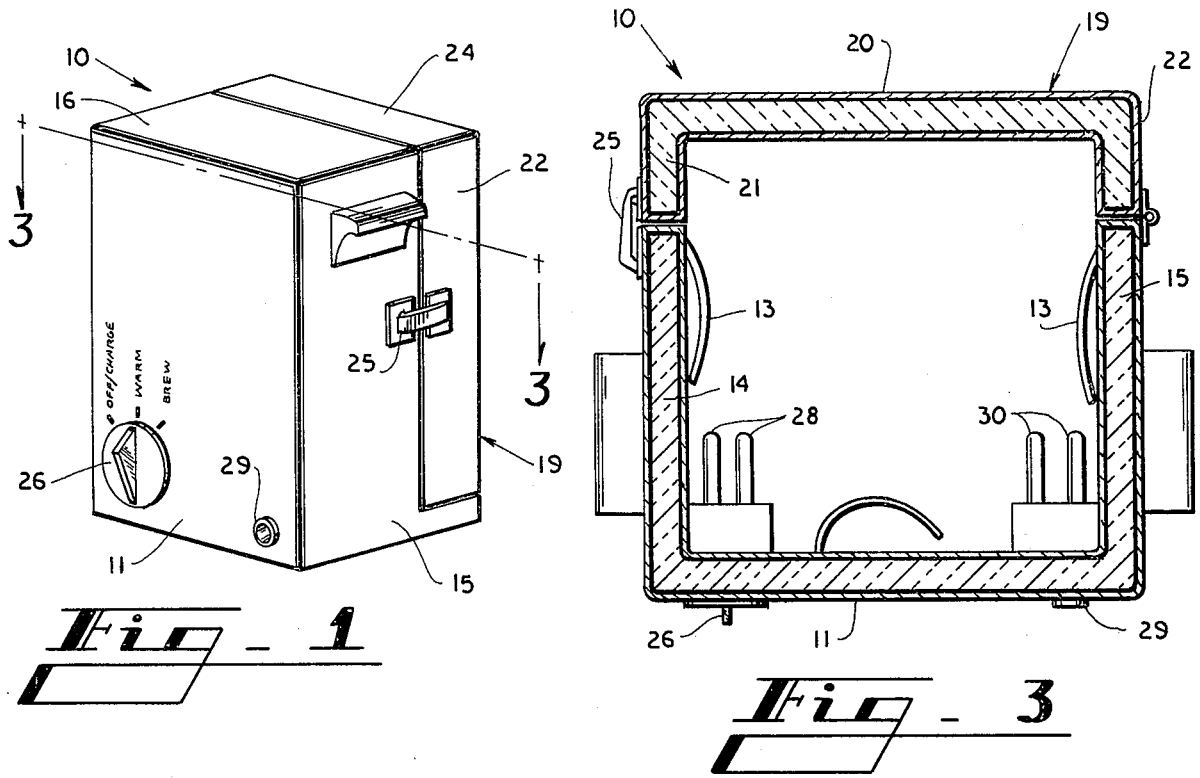
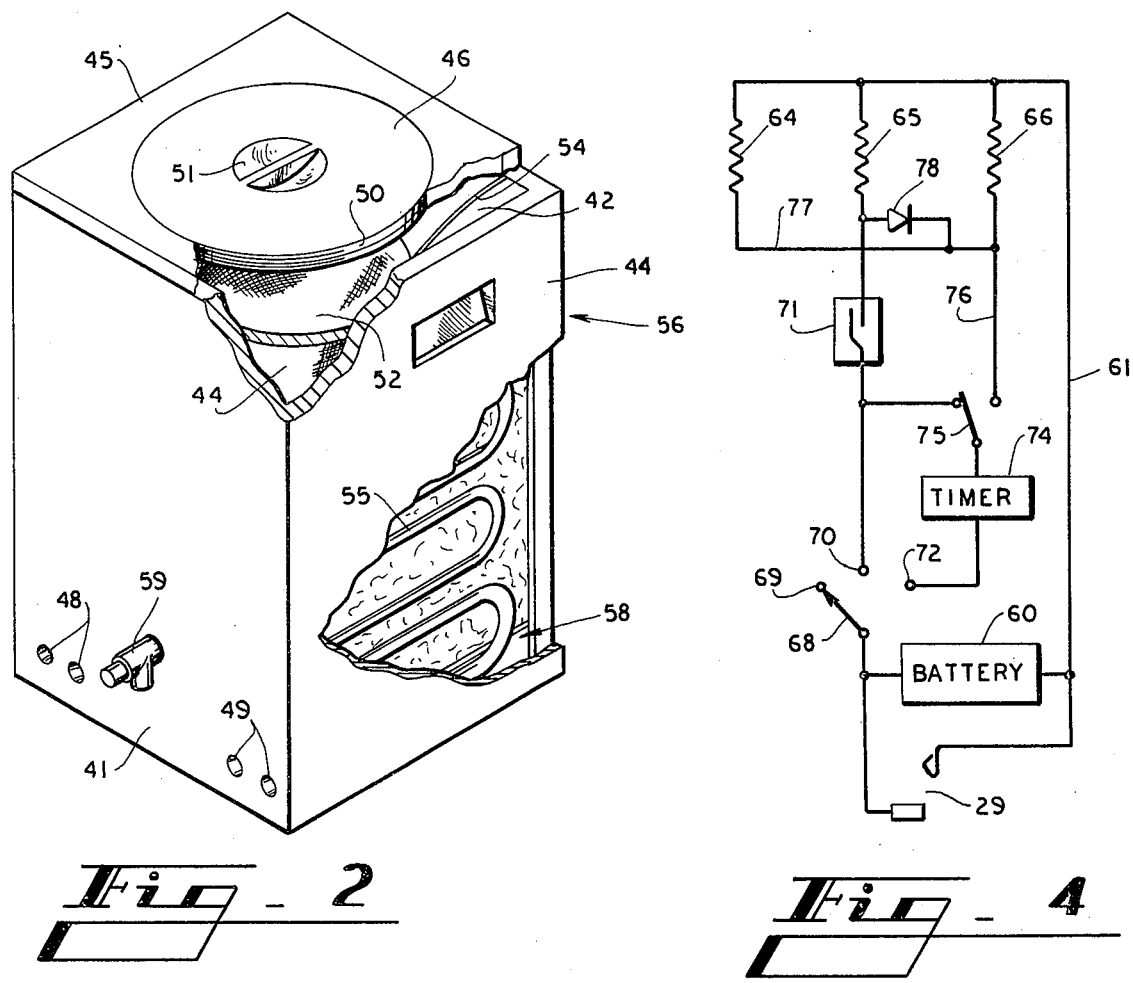

BATTERY POWERED COFFEE MAKER

CROSS-REFERENCE TO RELATED APPLICATION

This application is a continuation-in-part of the copending application filed by Helen G. Frye, having the Ser. No. 549,350, and the filing date of Feb. 12, 1975, now abandoned.

This invention relates to coffee pots and the like, and is more particularly concerned with a battery powered coffee pot for preparing coffee at below-boiling temperatures.

There have been numerous devices for heating water so one could reconstitute dried coffee, these prior art devices normally taking the form of a simple pot or the like having an electric heating element for heating the water. Many such devices, however, have no means for controlling the temperature, but simply continue to heat water as long as power is supplied to the device. Other forms of apparatus have thermostatic control means, but in these devices the water is normally brought substantially to the boiling point before some means operates to reduce the heat supplied to the pot.

In order to reconstitute dried coffee, it is desirable to raise the temperature of the water to a point below the boiling point, and to hold that temperature for a short time. This heat causes good reconstitution of the dehydrated product, but does not introduce a burnt or scorched flavor. However, if the dissolved coffee is subjected to exceptionally high temperatures as are normally encountered in water-heating apparatus there is a great likelihood of its taking on a scorched flavor.

Additionally, while battery powered apparatus has become quite common, there have not been any successful battery powered coffee makers. This is perhaps due to the large energy requirement for one to boil a quantity of water. Much of the energy goes into latent heat when water must be boiled, so that maintenance of water below the boiling point allows a greater percentage of the energy to go into sensible heat, thereby reducing the energy requirement.

The present invention, therefore, includes a container for liquid, the container having electric heating elements within at least one wall thereof, and preferably at least two walls thereof, in addition to a heating element in the bottom of the container. There are switching means provided to energize all heating elements for a predetermined length of time, then to energize only one heating element. This arrangement provides for the required heating for brewing, or full reconstitution of the coffee, followed by maintenance of serving temperature.

To assist in maintenance of serving temperature, an insulated housing is provided, the housing being designed both as a transport container and as a means to prevent heat loss. Further, the housing may include portions of the electric circuitry so the cycles can be controlled without removing the container from the housing.

These and other features and advantages will become apparent from consideration of the following specification when taken in conjunction with the accompanying drawings in which:

FIG. 1 is a perspective view illustrating a housing made in accordance with the present invention;

FIG. 2 is a perspective view of a container made in accordance with the present invention, the container being partially broken away to show the construction thereof;

FIG. 3 is a cross-sectional view taken substantially along the line 3—3 of FIG. 1 and showing the construction of the housing with the container removed therefrom; and, FIG. 4 is a schematic diagram showing one form of electric circuit for operation of the appartus of the present invention.

Referring now more particularly to the drawings, and to that embodiment of the invention here chosen by way of illustration, it will be seen in FIGS. 1 and 2 that the housing 10 is generally rectangular and has a front wall 11, a bottom 12, opposed side walls 14 and 15, and a top 16. Handles 18 are provided on the housing, the handles 18 being here shown as attached to each of the side walls 14 and 15 though it will be understood that any form of handle may be used to assist in manipulating the housing.

There is a rear section 19 of the housing 10 that is removable. The rear section 19 includes a rear wall 20 having side flanges 21 and 22, and a top flange 24. As here shown, there is a catch 25 on one side and a separable hinge on the other to fasten the rear section 19 to the housing 10. Thus, the housing can be hinged open, and removed entirely if desired.

The front 11 of the housing 10 includes a selector knob 26. The selector switch itself can be placed within the walls of the housing 10 so the knob 26 can be conveniently placed. Internally of the housing 10, there is a plug 28, here shown as consisting of two prongs, though it will of couse be understood that any desired form of electrical plug can be used in lieu of the style here illustrated. The function of the selector switch 68 and the plug 28 will be discussed in more detail hereinafter.

Also on the front 11 of the housing 10, there is a jack 29 to receive a plug for recharging the battery within the device. The jack 29 is electrically connected to a plug 30 that is within the housing 10. The details of this arrangement will be discussed later.

Attention is next directed to FIG. 2 of the drawings which shows the container for use in the illustrated embodiment of the present invention. It will here be seen that the container 40 includes a front 41, a back 42, and sides 44 arranged so the container 40 is substantially rectangular. The container is also provided with a top 45 having a removable cap 46 therein.

In more detail, the front 41 includes a female plug member 48 for receiving the male plug member 28 of the housing 10, and a female plug member 49 for receiving the male plug member 30. As will be better understood hereinafter, the plugs complete the electrical circuit for the apparatus.

The top 45 may be completely removable if desired since total removal would facilitate cleaning the device, as well as filling. The removable cap 46 would be used primarily, the cap 46 having threads 50 to mate with threads in the top 45 and provide a twist lock for the cap 46. A grip 51 is provided for ease of operation.

Below the cap 46 there is a basket, or strainer, 52 supported within the container 40. The basket 52 is made of fine mesh wire or the like, and can equally well be made of perforated sheet material, fabric, or other material capable of allowing liquid to pass through while retaining solids. The basket 52 is here shown as supported by arms 54 fixed to the basket 52 and resting on the walls of the container 40.

Electric heating elements are provided for the container 40, such heating elements being embedded within the walls of the container as indicated at 55. Though only one section, or element, for heating is here shown, as will become clear hereinafter, there is a plurality of heating elements for the container 40.

It is important to note that the container 40 is divided into the pot 56 in the upper portion of the container 40, and the base 58 in the lower portion of the container 40. The pot 56 comprises the coffee-making area for receiving water and the like, and the base 58 comprises the receptacle for the battery and other electrical components. In this connection it should be realized that the plugs 48 and 49 are in the lower portion to communicate with the base 58, and a spigot 59 is mounted to communicate with the pot 56 for dispensing liquids from the pot.

Attention is next directed to FIG. 4 of the drawings for an understanding of the operation of the device. There is a battery 60 that is contained within the base 58 of the container 40. The battery 60 has one side connected, by wire 61, to a plurality of heating elements, here shown as three resistors 64, 65 and 66. As here contemplated, the heating element 65 is in the bottom of the pot 56, and is used alone for maintaining the pot at serving temperature, and all three elements are to be energized when the pot is to be heated for brewing.

To achieve the desired function, the opposite side of the battery 60 is connected to the common side of the selector switch 68, the selector switch 68 being manually operated by the selector knob 26. The first position 69 of the selector switch 68 is the "off" position, and the contact is not connected to any other circuitry. The second position 70 of the selector switch 68 is the "warm" position, so the contact 70 is connected through a thermostat 71 to the heating element 65. The third position 72 of the selector switch 68 is the "brew" position, so the contact 72 is connected to the control circuitry for the brewing cycle.

When the selector knob 26 is placed in the brewing position, the liquid within the container 40 should be heated to a temperature somewhat below the boiling point, and maintained at that temperature for a brief duration. Then, the temperature should be lowered to a serving temperature and maintained as long as desired. To achieve this, the battery 60 is connected through the selector switch 68 to the contact 72, the contact 72 being connected to a timer 74 which controls a timer-switch 75. When the timer 74 is energized, the timer-switch 75 is transferred to place the battery potential on the wire 76 which is connected to both the heating elements 64 and 66 by a bus 77. Also, the heating element 65 is connected to the bus 77 through a diode 78. Thus, with one side of the battery 60 connected through wire 61 to all of the heating elements 64, 65 and 66 and the other side of the battery connected to the opposite side of all the heating elements, all three of the elements will be energized.

The three heating elements 64, 65 and 66 will remain energized as long as the timer-switch 75 remains in its transferred position, and this can be determined on the basis of time or on the basis of a temperature reached, either being within the scope of the present invention and determined by particular design preference. Once the timer-switch 75 returns to its normal position as shown in the drawing, the battery potential will be applied to the battery side of the thermostat 71. The diode 78 will prevent energization of the bus 77, so only the element 65 will be energized and this element is energized as determined by the thermostat 71.

From the foregoing description, the operation of the device should now be understandable. If a dried coffee of the type not to be boiled is to be prepared in the apparatus of the present invention, one would first place the appropriate quantity of water within the pot 56 of the container 40, then place the proper amount of the dried coffee product into the container. The cap 46 would be secured by means of the threads 50, and the container 40 would be ready to place into the housing 10.

Assuming the rear section 19 of the housing 10 is already removed, the container 40 would be slipped into the housing 10 through the rear opening provided. The spring members 13 on each of the side walls of the housing 10 will maintain the container 40 in lateral alignment and provide any needed cushioning to prevent shocks to the container 40.

When the container 40 reaches the front wall 11 of the housing 10, the male plugs 28 and 30 will enter the jacks 48 and 49 to complete the electric circuitry. After the plugs are fully engaged and the container 40 is completely within the housing 10, the rear section 19 should be installed on the housing 10 by placing the section 19 over the rear of the container 40, and engaging the latch 25.

Now, the selector knob 26 should be set at the "brew" position, which will place the selector switch 68 on the contact 72. This connects the battery 60 to the timer 74 and causes the timer-switch 75 to move to its transferred position. With the timer-switch 75 to move to its transferred position. With the timer-switch 75 battery potential is placed on the wire 76 to energize the bus 77. With the bus 77 energized, all three of the heating elements 64, 65 and 66 will be energized so that heat is generated in opposing walls of the container 40 and in the bottom of the container. The heating will continue until the timer 74 causes the timer-switch 75 to be returned to its normal position, whereupon only the heating element 65 will be energized, and this through the thermostat 71.

If the coffee is being brewed in a location where electrical power is available, one can use an external source of power by inserting a plug into the jack 29. This will operate the apparatus and/or charge the battery 60 depending on the placement of the selector switch 68.

In the event the appartus of the present invention is to be used to make coffee or the like requiring an extraction from ground coffee, the ground coffee can be placed in the basket 52. It is possible that the steam generated by the simmering water will provide sufficient extraction to make coffee, or tea, or the like; however, if the steam alone does not result in sufficient extraction, heated water can be removed via the spigot 59 and poured through the ground coffee in the strainer 52.

Since the apparatus of the present invention uses relatively low temperatures, there tends to be less energy loss, and this features is further enhanced by the use of the insulated housing 10. An insulating material such as foamed polyurethane or polystyrene can be used to provide both good insulation qualities and light weight so the device is easy to handle.

It will be obvious that the apparatus can be used to heat things other than coffee. Such things as tea, soups, ready-to-eat canned products and the like are admirably suited for heating in the device. The low heat tends to assure that the material will not burn or scorch, and will not become dry.

Of course the embodiment of the invention here presented is by way of illustration only, and is meant to be in no way restrictive; therefore, numerous changes and modifications may be made, and the full use of equivalents resorted to without departing from the spirit or scope of the invention as defined by the appended claims.

I claim:

1. A coffee maker comprising a container and an insulated housing for said container, said container including opposed walls, a top, and a base, a first heating element in one of said opposed walls, a second heating element in the other of said opposed walls, and a third heating element in said base, power supply means in said base, and selector means for selectively connecting said power supply means to said first heating element, said second heating element and said third heating element, said selector means including a first circuit means for connecting said first heating element, said second heating element and said third heating element in parallel with one another and with said power supply means, and second circuit means for connecting said third heating element in parallel with said power supply means and for isolating said first heating element and said second heating element, said housing including a front panel, a bottom, substantially parallel side walls, and a top substantially parallel to said bottom, a plug fixed to said front panel and extending inwardly of said housing, a jack in said base of said container, said plug and said jack being located so that said plug is received within said jack when said container is placed within said housing, and a selector knob, said selector knob being electrically connected to said first circuit means and said second circuit means.

2. A coffee maker as claimed in claim 1, and further including timing means for disconnecting said first circuit means when a predetermined condition is reached and automatically connecting said second circuit means.

3. A coffee maker as claimed in claim 2, and including a plurality of spring means within said housing, each of said plurality of spring means being located between said container and said housing for locating said container within said housing.

* * * * *